Figure 1:
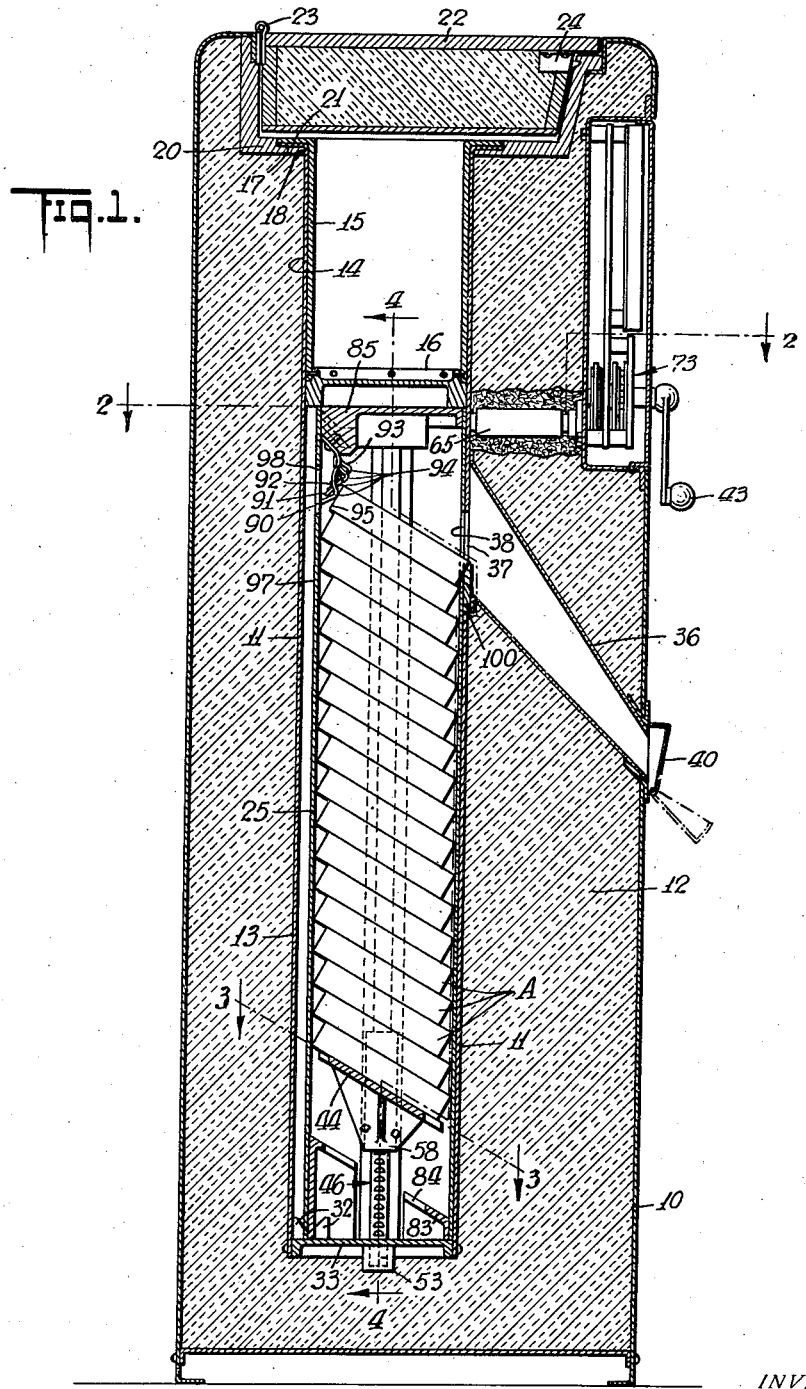

April 28, 1942.  R. F. EDDY ET AL  2,281,191

VENDING MACHINE

Filed March 26, 1940  4 Sheets-Sheet 1

INVENTORS
ROBERT F. EDDY
EMIL W. MOELLER
RALPH R. WILCOX
ALLAN F. EDDY

BY Richard Newling
ATTORNEY

April 28, 1942.    R. F. EDDY ET AL    2,281,191
VENDING MACHINE
Filed March 26, 1940    4 Sheets-Sheet 2
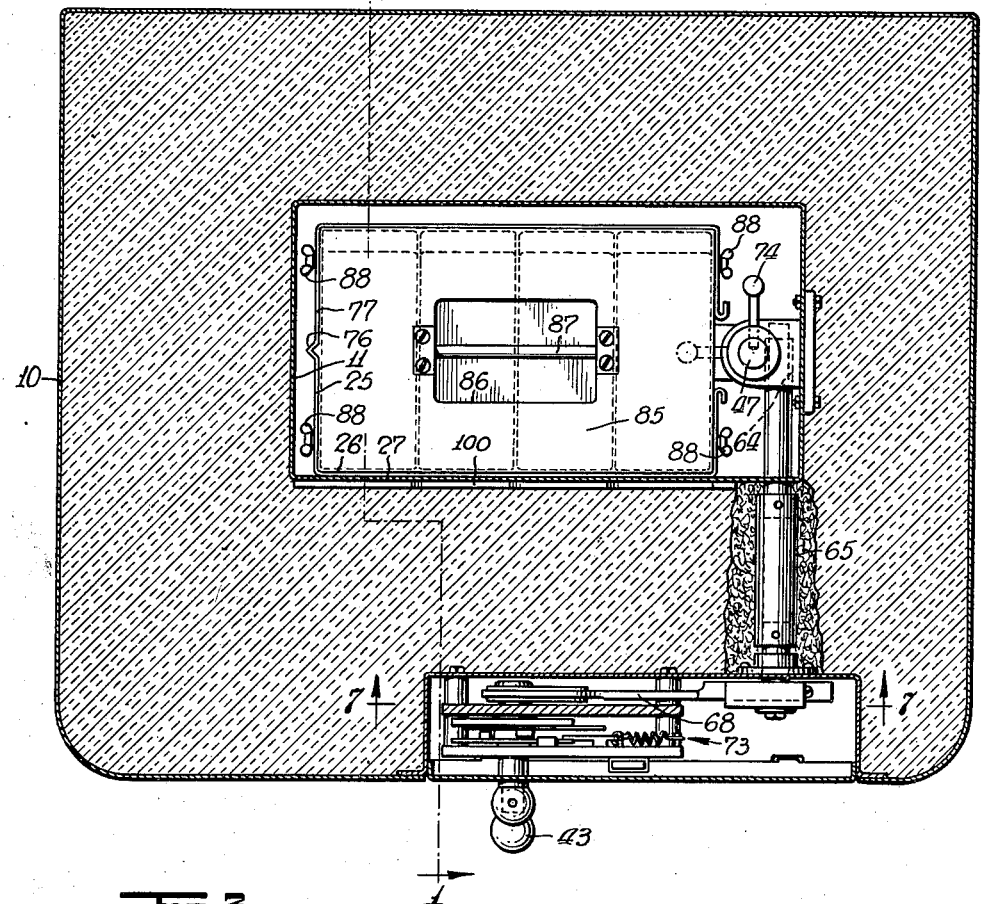
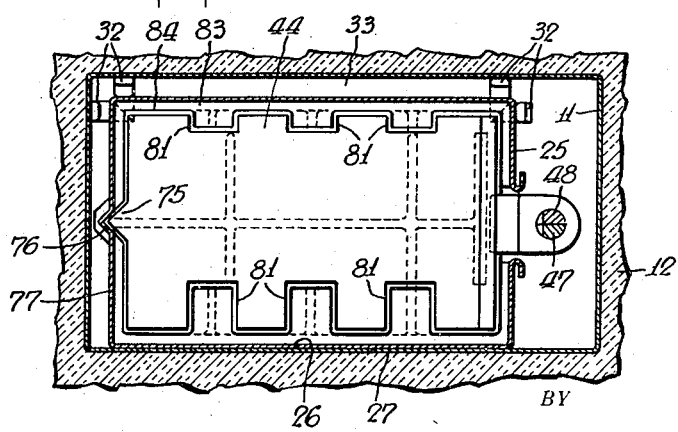
INVENTORS
ROBERT F. EDDY
EMIL W. MOELLER
RALPH R. WILCOX
ALLAN F. EDDY
BY
Richard J. Cowling
ATTORNEY

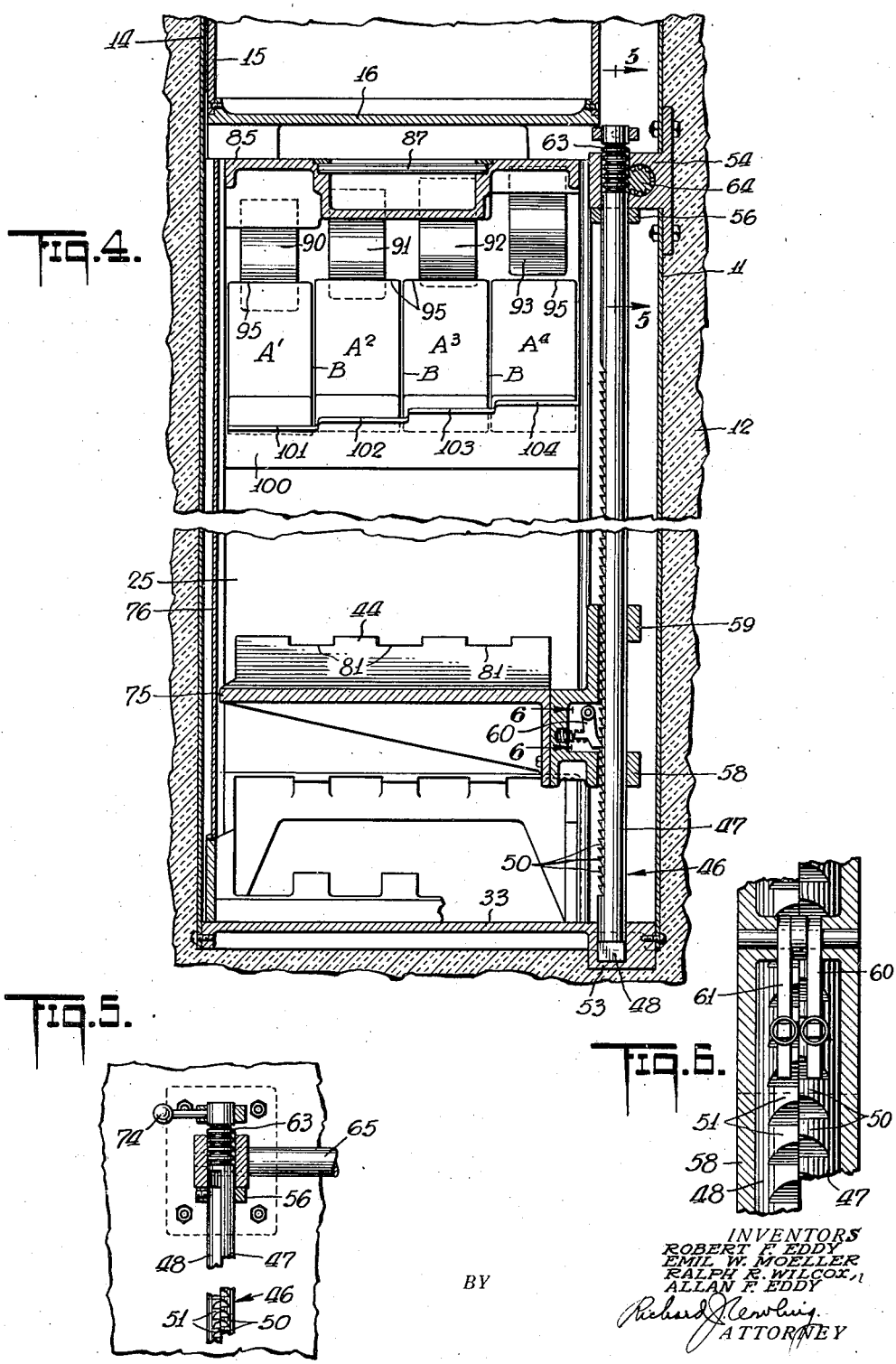

April 28, 1942.　　R. F. EDDY ET AL　　2,281,191
VENDING MACHINE
Filed March 26, 1940　　4 Sheets-Sheet 4
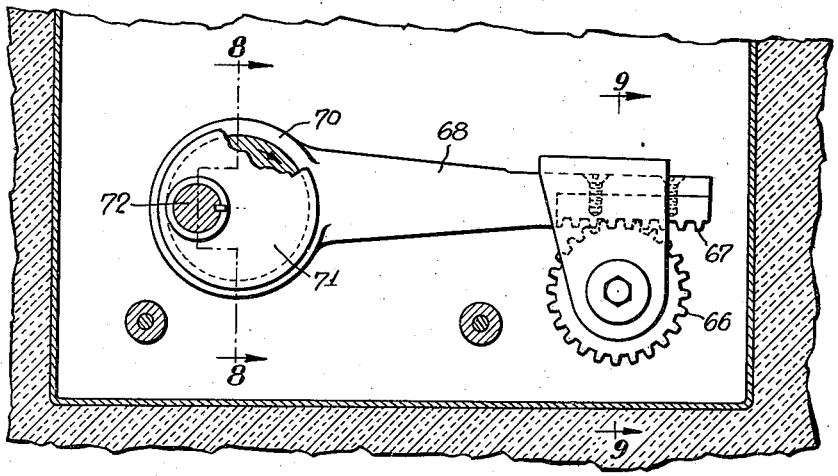
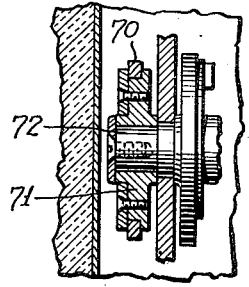
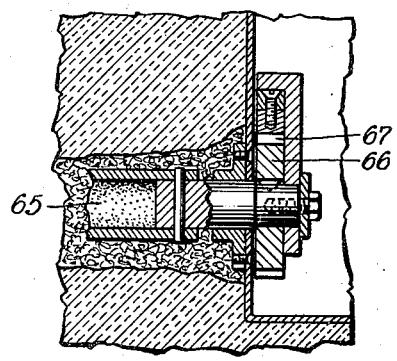
INVENTORS
ROBERT F. EDDY
EMIL W. MOELLER
RALPH R. WILCOX
ALLAN F. EDDY
BY
Richard Newling
ATTORNEY Patented Apr. 28, 1942

2,281,191

UNITED STATES PATENT OFFICE 2,281,191

VENDING MACHINE

Robert F. Eddy, Emil W. Moeller, Ralph R. Wilcox, and Allan F. Eddy, South Pasadena, Calif.

Application March 26, 1940, Serial No. 325,962

8 Claims. (Cl. 312—36)

The present invention relates to vending or dispensing machines, especially for use in handling refrigerated articles such as frozen confections or frozen food products.

One object of the present invention is to provide a vending machine of the general type referred to, having simple and reliable means for expelling the packages with a minimum amount of mechanical handling, so that said packages are subjected to little or no marring during discharge operations. To carry out this object, the package stack is moved upwardly step by step to bring the packages successively into discharge position from the top down. During this upward movement, the top package is cammed towards a discharge chute to break the frost bond between said top package and the next lower one, and to impart a forward impetus to said package towards said chute. From then on, the top package is discharged by gravity into the chute.

As a further feature, the package stack is so supported that the packages are inclined downwardly towards the inlet of the discharge chute to aid in the gravity discharge of said packages.

As another feature, the simple expelling means described is capable of discharging packages successively from a multiple stack column.

Various other objects and advantages of the invention will be apparent from the following particular description, and from an inspection of the accompanying drawings, in which:

Fig. 1 is a longitudinal section of a form of vending machine embodying the present invention, Figs. 2, 3 and 4 are sections taken on lines 2—2, 3—3 and 4—4 of Fig. 1 respectively, Figs. 5 and 6 are sections taken on lines 5—5 and 6—6 of Fig. 4 respectively, Fig. 7 is a section taken on line 7—7 of Fig. 2, and Figs. 8 and 9 are sections taken on lines 8—8 and 9—9 of Fig. 7 respectively.

In the specific form of the invention, the vending machine comprises an outer cabinet shell 10, shown of substantially rectangular cross-section, an inner shell or receptacle 11, which extends substantially centrally in said outer shell, and which is also desirably of rectangular cross-section, and a filling 12 of suitable insulating material between said shells. The lower portion 13 of the inner receptacle 11 serves as a storage compartment for the vendible refrigerated packages A, while the upper end 14 serves as a compartment for a removable receiver 15 containing suitable refrigerant, desirably dry ice. This refrigerant receiver 15, desirably of rectangular cross-section, has its four peripheral walls constructed of material having low heat conductivity, and has its lower end closed by a metal head 16 shown in the form of a flanged casting (Figs. 1 and 4).

To facilitate the mounting of the inner receptacle 11 in position in the interior of the cabinet 10, said receptacle has at its upper end an outward flange 17, seated on a shoulder formed around the sides of an opening 18 which is provided in the top wall 20 of said cabinet, and which affords access to the interior of said receptacle.

The refrigerant receiver 15 is provided at its upper end with an outward flange 21, seated on the receptacle flange 17, and is accessible and easily removable through the cabinet opening 18. Suitable handles (not shown) are desirably provided for convenient handling of the refrigerant receiver 15 in or out of the receptacle 11.

The cabinet opening 18 is closed by a cover 22, desirably hinged to the cabinet at 23, and held in closed position by a key lock 24. Suitable gasket means (not shown) are provided for hermetically sealing the cover 22 in closed position.

Extending lengthwise in the package storage compartment 13 of the receptacle 11 is a removable package magazine 25, having a rectangular cross-section and desirably made of sheet metal. This package magazine 25 is shown positioned with one wall 26 thereof in contact with the receptacle wall 27 and with its other three walls spaced from the corresponding receptacle walls as shown in Figs. 2 and 3. In order to so properly position the magazine 25 in the receptacle 11, there is provided a series of wedge-shaped members 32 (Figs. 1 and 3), mounted on the base 33 of the receptacle 11, and serving by their inclined surfaces to cam the magazine 25 laterally in proper relationship with said receptacle as said magazine is lowered thereinto. The bases of these centering members 32 serve to hold the magazine 25 in its lowermost position against lateral movement.

The space formed between the magazine 25 and the receptacle 11 permits free circulation of the refrigerant gases in said space and around said magazine, and thereby assures proper and economical refrigeration of the packages in said magazine.

Connected to one side of the receptacle 11 is a downwardly inclined discharge chute 36, which communicates at its upper end with the interior of said receptacle and the package magazine 25 through aligned discharge openings 37 and 38 in the walls of said receptacle and said magazine respectively, and which terminates at its other end in an outlet normally closed by a spring-pressed hinged door 40.

The stacks of refrigerated packages A are moved upwardly step by step in the magazine 25 in response to the manipulation of a crank handle 43, and are supported on a downwardly inclined platform 44, so that said packages as they are moved successively into discharge position with respect to the discharge openings 37 and 38, and after they have been freed from frost bond with the next lower packages as will be described, will slidably gravitate through said openings and downwardly along the discharge chute 36.

The elevator mechanism for moving the packages A upwardly step by step includes an upright feed or elevator bar 46, extending in the receptacle 11 on one side of the magazine 25 and slidably supporting the platform 44. This feed bar 46 comprises a pair of semi-circular sections 47 and 48 (Figs. 1, 4, 5 and 6), arranged with their flat surfaces juxtaposed, and provided on adjoining curved sides with ratchet teeth 50 and 51 respectively. The lower end of the feed bar 46 is journalled in a bearing 53, desirably formed in the bottom wall 33 of the receptacle 11, while the upper end is journalled in a bearing block 54, shown secured to one of the side walls of the receptacle 11. One of the bar sections 48 is held against lengthwise movement, and for that purpose seats in the bearing 53 at its lower end, and has secured to its upper end a collar 56 impinging the lower side of the bearing block 54. By means of this arrangement, the bar section 48 is held against longitudinal displacement while the other bar section 47 is oscillated vertically a short distance upon the operation of the crank handle 43 as will be described.

The platform 44 has a pair of vertically spaced sleeves 58 and 59, loosely embracing the bar 46 for vertical slide movement therealong, and carries a pair of pivotally supported pawls 60 and 61, spring-pressed into engagement with the ratchet teeth 50 and 51 respectively.

Upon operation of the crank 43, the bar section 47 is moved upwardly by a transmission between said crank and said bar section as will be described hereinafter. This upward movement of the bar section 47 causes a corresponding upward movement of the platform 44 through the engagement of the pawl 60 with the ratchet teeth 50, while the other pawl 61 rides idly upwardly over the stationary ratchet teeth 51. Upon return downward movement of the bar section 47, the pawl 61, having caught in the ratchet teeth 51, prevents downward return movement of the platform 44.

At the point where the maximum height is reached by the platform 44, the series of teeth on the bar section 48 ends. Further movement of the movable bar section 47 will only cause the platform 44 to rise and fall with said movable bar, since the pawl 61 will have no teeth to engage, but will ride idly on the smooth part of the fixed bar section 48.

For oscillating the bar section 47 as described, the upper end of said bar section is provided with rack teeth 63, meshing with a pinion 64 at one end of a shaft 65, desirably having a non-conducting hollow section to prevent undue loss of refrigeration therethrough. The other end of the shaft 65 has affixed thereto a pinion 66 (Figs. 7, 8 and 9), meshing with rack teeth 67 at one end of an arm 68. The other end of the arm 68 is in the form of a collar 70, rotatably embracing a disc 71, which is eccentrically fixed to a crank shaft 72 connected to the crank handle 43. During the first half of a clockwise revolution of the crank handle 43 towards the position of the eccentric disc 71 shown in Fig. 7, the bar section 47 is moved upwardly a distance equal to the distance between successive ratchet teeth 50. During the remaining half of the clockwise revolution of the crank handle 43, the bar section 47 is moved downwardly to its original position, while the platform 44 is retained in elevated position.

The crank handle 43 is shown controlled from a coin control mechanism 73, although as far as certain aspects of the invention are concerned, the vending machine need not be coin controlled, but may be under the supervision of a store attendant, to whom the purchasing money is directly paid. The coin control mechanism 73, if one is used, may be of any suitable well-known construction, such as that shown and described in our co-pending application Serial No. 283,946, filed July 12, 1939.

The two bar sections 47 and 48 are rotatable in unison to permit the platform 44 to gravitate to its lowermost position for refilling operations. For that purpose, a suitable handle 74 is affixed to the upper end of the bar section 47. When the bar sections 47 and 48 are rotated sufficiently to present the smooth sides of said sections to the pawls 60 and 61, the platform 44 drops by gravity into its lowermost position.

The platform 44 is held against rotation, while guided for vertical movement along the package magazine 25. For that purpose, a V-shaped projection 75 (Figs. 2, 3 and 4) on one side of said platform extends in a correspondingly shaped guideway 76 formed in the magazine wall 77.

In order to prevent the platform 44 from becoming frost bonded to the peripheral walls of the magazine 25, two of the opposite edges of said platform are each desirably formed with a series of spaced slots 81, breaking up the continuity of said edges as shown in Figs. 3 and 4. This interruption in the platform edges serves to reduce the amount of surface apt to be frost bonded to the walls of the magazine, and also materially reduces the weight of the platform. Furthermore, the notches 81 serve to increase the amount of surface area of the packages exposed to the refrigerated air in the magazine.

The package magazine 25 is provided with an inclined bottom wall 83, which corresponds in inclination to the inclination of the platform 44, and which has an opening 84 corresponding in contour to the contour of the platform 44 as shown in Fig. 4, but slightly larger to permit said platform to pass therethrough. In its lowermost position, the platform 44 extends substantially in the same plane or a slight distance above the inclined magazine wall 83. With this construction, when the loaded magazine 25 is lowered to its full depth in the receptacle 11, the weight of the articles or packages will be transferred from the magazine 25 to the platform 44. This replenishment can be done so expeditiously, that the loss of evaporation in the cabinet usually attending such replenishment is very low.

In order to facilitate the handling of the magazine 25 in or out of the receptacle 11, and to support part of the package expelling mechanism, there is removably mounted at the upper end of said magazine a head 85 (Figs. 1, 2 and 4), having an opening, shown in the form of a pocket 86 at least large enough to permit a hand to enter thereinto. Extending across this opening 66 is a bar 87 serving as a handle or bail for said head. This head 85 is removably secured to the magazine section 25 by suitable fastening members shown in the form of thumb or wing screws 88.

The packages are shown arranged on the platform 44 in four vertical stacks, and their inclination is such that if free to slide, the top packages will slidably gravitate through the openings 37 and 38 and into the chute 36 when said top packages are in discharge position with respect to said openings. However, due to the refrigeration in the cabinet, the packages may be stuck together by a frost bond sufficient to prevent the sliding of the top packages through the discharge openings. In order to break this frost bond, there is provided a series of cams in the form of spring fingers 90, 91, 92 and 93 (Figs. 1 and 4), four of these being shown, one for each stack. These fingers are connected to and depend from the head 85 as shown in Figs. 1 and 4, and are bent to present convex cam sections 94 respectively to the rear sides 95 of the top packages as said packages are moved upwardly in discharge position. These cam sections 94 are arranged at progressively different elevations as shown in Fig. 1, the distance between adjacent cam sections 94 being equal to the distance the platform 44 is moved upwardly at each step or each revolution of the crank handle 43. In the present specific construction, this distance is equal to the distance between ratchet teeth 50 on the bar section 47. In order to permit free unimpeded spring movement of the fingers 90, 91, 92 and 93, the magazine wall 97 is provided with an opening 98 through which the free ends of said fingers may pass during the camming action of said fingers.

Secured to the magazine wall across the lower section of the opening 38 is a lip plate 100, having an upper edge divided into four sections 101, 102, 103 and 104, arranged in step formation corresponding to the step formation of the cam sections 94 of the spring fingers, with the distances between the elevations of adjacent lip sections equal to those between adjacent cam sections 94. Each of these lip sections 101, 102, 103 and 104 extends a short distance to the right of the dividing plane B of each stack of packages as shown in Fig. 4, so as to afford sufficient clearance on both sides of each package as it is discharged through the opening 38.

In the operation of the cam fingers 90 to 93, as the platform 44 is moved upwardly one step by the rotation of the crank handle 43 one revolution, the top package A' of the first stack is moved upwardly until it almost clears the lip section 101. As the package A' continues its upward one step movement, the cam finger 90 acting on the rear inclined face 95 of said package cams said package towards the outlet 38, and thereby breaks the frost bond between said package and the next lower one. Upon completion of the upward one step movement of the package A', said package will have cleared the lip section 101, so that it will be free to gravitate through the openings 37 and 38 and into the discharge chute 36. The forward impulse imparted to the package A' by the camming action of the spring finger 90 will not only break the frost bond as described, but will also overcome the inertia of the package A'. During the operation described, the three other stacks of packages have been moved upwardly one step equal to the distance between ratchet teeth 50, but the top packages thereof have not been affected by the spring fingers 91, 92 and 93.

Upon the next revolution of the crank handle 43, the rear edge 95 of the top package A² of the next stack will come into engagement with the cam spring 91 and be moved forwardly through the openings 38 and over the lip section 102 into the chute 36 in the manner already described with reference to the discharge of package A'. The next two successive revolutions of the crank handle 43 will cause the successive discharge of the packages A³ and A⁴ in a similar manner. After the top layer of packages A', A², A³ and A⁴ has been discharged as described, then the next successive upward step of the platform 44 will cause discharge of the top package on the left hand stack shown in Fig. 4, so that the operation is repeated. By means of this operation, the packages get little or no handling during discharge operation. There are no complicated expelling mechanisms which mechanically handle the packages and cause undesirable marring thereof. The only contact of the expelling mechanism with the packages is on the rear face of said packages, and this is not sufficient to mar said packages.

As many changes could be made in the above construction, and many apparently widely different embodiments of the invention could be made without departing from the scope of the claims, it is intended that all matter contained in the above description or shown in the accompanying drawings shall be interpreted as illustrative and not in a limiting sense.

Having thus described our invention, what we claim as new and desire to secure by Letters Patent is:

1. In a machine for dispensing articles, the combination comprising a cabinet, means for supporting in an inclined position a stack of articles to be dispensed in said cabinet, a discharge chute, means for feeding said stack upwardly step by step to bring the top article successively in discharge position with respect to said chute, the inclination of said articles being sufficiently steep so that when the top article is in discharge position and free to slide over the next lower article it will slidably gravitate towards the inlet of said discharge chute, and a removable stationary cam adapted to be positioned in the path of upward travel of the articles, engaging the top article while the stack is moving upwardly to impart to said top article a slide impetus toward the inlet of said discharge chute.

2. In a machine for dispensing articles, the combination comprising a cabinet, means for supporting in an inclined position a stack of the articles to be dispensed in said cabinet, a discharge chute, means for feeding said stack upwardly step by step to bring the top article successively in discharge position with respect to said chute, and a stationary cam in the path of upward movement of the articles engaging the rear side of said top article as it is moved upwardly for moving said top article forwardly towards the inlet of said discharge chute.

3. In a machine for dispensing articles, the combination comprising a cabinet, means for supporting in an inclined position a stack of the articles to be dispensed in said cabinet, a discharge chute, means for feeding said stack upwardly step by step to bring the top article successively in discharge position with respect to said chute, and a stationary spring finger bent to present a cam surface to the rear side of said top article as it is moved upwardly to move said top article forwardly towards the inlet of said discharge chute.

4. In a machine for dispensing articles, the combination comprising a cabinet, means for supporting in an inclined position a stack of articles to be dispensed in said cabinet, a discharge chute, means for feeding said stack upwardly step by step to bring the top article successively in discharge position with respect to said chute, the inclination of said articles being sufficiently steep so that when the top article is in discharge position and free to slide over the next lower article, it will slidably gravitate towards the inlet of said chute, and a stationary spring finger bent to present a cam surface to the rear side of said top article as it is moved upwardly to move said top article forwardly towards the inlet of said discharge chute.

5. In a machine for dispensing articles, the combination comprising a cabinet, a receptacle in said cabinet adapted to hold a plurality of adjoining stacks of the articles to be dispensed, a discharge chute, means for feeding said stacks upwardly step by step to bring the top articles in discharge position with respect to said chute, a plurality of cams, one for each stack, said cams having respective cam surfaces at progressively different elevations engaging the rear sides of the top articles successively from one stack to the other as said stacks are moved upwardly, to move said top articles forwardly towards the inlet of said chute.

6. In a machine for dispensing refrigerated articles, the combination comprising a cabinet, a receptacle in said cabinet adapted to hold a plurality of adjoining stacks of inclined refrigerated articles to be dispensed, a discharge chute, means for feeding said stacks upwardly step by step to bring the top articles in discharge position with respect to said chute, the inclination of said articles being sufficiently steep so that when the top articles are in discharge position and free to slide over the next lower articles, they will slidably gravitate towards the inlet of said chute, a plurality of spring fingers, one for each stack, said fingers being bent to present respectively cam surfaces at progressively different elevations, said surfaces engaging the rear sides of the top articles successively from one stack to the other as said stacks are moved upwardly to move said top articles forwardly towards the inlet of said chute, whereby the frost bonds between said top articles and the next lower ones are broken, and said top articles are permitted to slidably gravitate towards the inlet of said chute.

7. In a machine for dispensing articles, the combination comprising a cabinet, a receptacle in said cabinet adapted to hold a plurality of adjoining inclined stacks of the articles to be dispensed, and having an outlet opening provided with a lip across its lower side, said lip having a series of adjoining step sections, one for each stack, a discharge chute connecting at its inlet with said outlet opening, and means operable while said stacks are being moved upwardly for camming the top articles towards said chute successively from one stack to the other, to gravitationally discharge said top articles towards the inlet of said chute as they move successively above their corresponding step sections of said lip.

8. In a machine for dispensing articles, the combination comprising a cabinet, a receptacle in said cabinet, a magazine removably supported in said receptacle and adapted to hold therein a stack of the articles to be dispensed, said magazine being adapted to be loaded outside said cabinet and forming with the articles loaded therein a unit which can be inserted as such in said receptacle after removal of an empty magazine therefrom, a discharge chute, means for feeding said articles upwardly step by step in said first named magazine to bring the articles successively in discharge position with respect to said chute, and a stationary expelling cam member depending from the back of the head of said magazine and forming a removable unit therewith, said cam member being adapted to cam the top article of said stack towards the inlet of said chute as said stack is moved upwardly.

ROBERT F. EDDY.
EMIL W. MOELLER.
RALPH R. WILCOX.
ALLAN F. EDDY.